Dec. 11, 1962 — R. ROCHE — 3,068,162
SYSTEMS FOR ASSEMBLING TOGETHER TWO PIECES HAVING ANISOTROPIC EXPANSIONS
Filed May 15, 1958 — 4 Sheets-Sheet 1

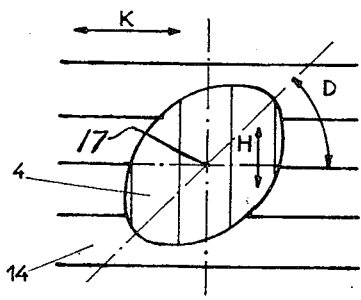
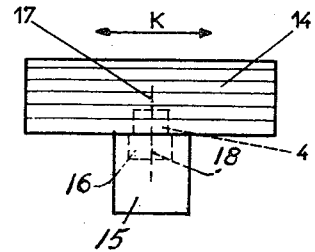
Fig.9      Fig.11
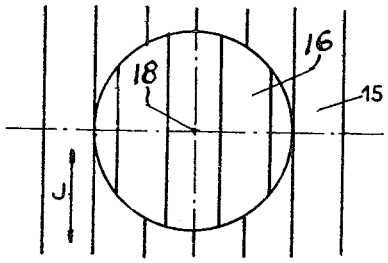
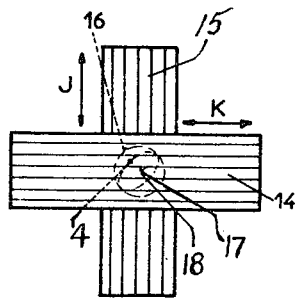
Fig.10      Fig.12

United States Patent Office 3,068,162
Patented Dec. 11, 1962

3,068,162
SYSTEMS FOR ASSEMBLING TOGETHER TWO
PIECES HAVING ANISOTROPIC EXPANSIONS
Roland Roche, Paris, France, assignor to Commissariat a
l'Energie Atomique, Paris, France, a state administration
Filed May 15, 1958, Ser. No. 735,441
Claims priority, application France May 17, 1957
8 Claims. (Cl. 204—193.2)

The present invention relates to systems for assembling together two pieces having anisotropic expansions, and in particular for assembling with each other two bars (of graphite or equivalent material) belonging to two crossed layers included in the moderator structure of a nuclear reactor.

It is known that some materials, when they are subjected to the action of heat, moisture, nuclear radiations, and the like, expand or retract in an anisotropic manner, that is to say if their expansion in a given direction, for a given variation of the value of one of these causes, is $\alpha\%$, their expansion in another direction, corresponding to the same variation, will be $\beta\%$, $\beta$ being different from $\alpha$. Quantities $\alpha$ and $\beta$ may be both positive (expansion) or negative (retraction), or one of them is positive and the other negative.

The main axes of expansion are those which determine the directions in which the coefficient of expansion for a given material has a maximum or minimum value. These main axes are always orthogonal to one another.

The conventional systems of assembly making use of studs, sleeves, keys, slide-ways, etc., for assembling together bodies having an isotropic expansion, or bodies having an anisotropic expansion but the corresponding main axes of expansion of which coincide, cannot be used for bodies having an anisotropic expansion and the corresponding main axes of expansion of which do not coincide, because they give rise to phenomenons two examples of which are for instance as follows:

If, in one direction, the male element of the assembly expands less than the female element, the play in this direction increases with the expansion;

If, on the contrary, the male element of the assembly expands more than the female element, the play will decrease as the expansion increases and it may become zero and lead to a risk of breaking the assembled elements.

Due to the displacement of carbon atoms by neutrons (Wigner effect), the effects of anisotropic expansion (also called "orthotropic expansion" due to the fact that the main axes of expansion are orthogonal to one another) are very particular in the case of graphite bars used as moderator elements in some nuclear reactors. The Wigner effect undergone by extruded graphite produces, in first approximation, a small expansion followed after a time by a small contraction in the direction of the axis of extrusion and an important expansion along the axes perpendicular to said first mentioned axis, the axis of extrusion being one of the main axes of deformation. This involves complicated problems for maintaining the assemblies of such bars in their initial position.

FIGS. 1 to 3 which are characteristic of the prior art, show the arrangements generally used for assembling the bars of an orthotropic expansion material, for instance the graphite bars constituting the moderator structure of a nuclear reactor.

In order to ensure stability of the bars piled upon one another, said bars are disposed in superimposed layers crossed with respect to one another, the direction of the bars of one layer being at right angles to those of the two adjacent layers.

Each bar 1 of a layer is connected to two bars 2 and 3 of the layer immediately thereunder, these two bars being the middle bar 2 (or a bar close to the middle bar) and one of the end bars 3.

The connection between bar 1 and bar 2 is such that the only possible displacement between these two bars is a horizontal rotation. The means generally used for this purpose consist in a pin or sleeve 4.

The connection between bar 1 and bar 3 must prevent such a rotation. For this purpose, a rectilinear guiding, ensured by a sliding key 5, may be used.

If such connections are correctly disposed, it seems that any stress in the assembling means is avoided. But, for practical purposes, it is necessary to consider the sum of the two following perturbing effects:

(a) The bars are not all exactly identical to one another so that each of them does not bear upon all the bars of the layer located under it.

(b) Due to the expansions caused by temperature variations and by the Wigner effect, the bars expand and they become curved.

Furthermore, the expansions due to the Wigner effect are erratic, which means that they vary from one graphite bar to the other as a consequence of the variations of the neutron flux, of the differences of thermal adjustment between the channels of the reactor, of the slight differences of quality of graphite from one bar to the next one or even in different portions of the same bar, and of the spontaneous rearrangement of the atomic structures of portions of the bars.

As a consequence of all these phenomenons, the assembly elements either become loose with respect to the parts to be assembled, or they are tightened against them.

FIGS. 2 and 3 show what takes place when bars such as 1 and 3 are assembled together in the conventional manner.

In the case of FIG. 2, a key element 5, cut in a piece of graphite and extending transversely to the direction of extrusion G of this graphite, is engaged in a slot 6 of corresponding elongated shape extending in the direction of extrusion H of bar 1, said slot 6 being longer than key 5. Said key is also engaged in another slot, not visible on the drawing, formed in bar 3, the direction of extrusion of which corresponds to that of said key 5. During the operation of the reactor, the width of slot 6 increases considerably under the effect of the transverse Wigner expansion of bar 1, whereas the width of key 5 increases but little, or even decreases. The play between the longitudinal walls of slot 6 and of key 5 therefore increases as a consequence of the Wigner effect.

The play of key 5 in the slot provided in bar 3 is not modified due to the similarity of the respective deformations of this key and of this bar.

In the case of FIG. 3, a key 5, cut in a piece of graphite, in the direction of extrusion G of this graphite, is engaged in a slot 6 of corresponding elongated shape extending at right angles to the direction of extrusion H of bar 1 and longer than this key. It is also engaged in a slot, not visible on the drawing, provided in bar 3, the direction of extrusion of which corresponds to that of the key. During the operation of the reactor, when the Wigner effect increases, the initial play existing between the longitudinal walls of the key and of the corresponding slot decreases constantly, and it may become zero and even result in a tightening of the pieces against each other, which may cause them to break.

The object of the present invention is to provide a system of assembling bars such that the initial plays are maintained without any substantial variation thereof.

According to said invention, such a system is for assembling together two pieces having substantially identical anisotropic expansions, and each having three main axes of expansion orthogonal to one another, these three axes being $Ox$, $Oy$, $Oz$ for one of the pieces and $Ox'$, $Oy'$, $Oz'$ for the other, these pieces being such that two of their main axes of expansion (respectively $Ox$ and $Oy$ for one of said pieces and $Ox'$ and $Oy'$ for the other) are located in two parallel planes, and that $Ox$ is perpendicular to $Ox'$ and $Oy$ to $Oy'$.

According to the present invention, this system includes, in combination, a member at least one portion of the surface of which is limited by a cylinder the generatrices of which are parallel to axis $Oz$ and the cross-section of which is a curve given by the equation $$(1+r)X^2 - (1-r)Y^2 = K$$

$Ox$ and $Oy$ being the bisectors of the angle made by $Ox$ and $Oy$, $K$ being a constant and $r$ being equal to the ratio $$\frac{\omega}{\alpha - \beta}$$

in which $\omega$ is the angle, of small value, through which the pieces can be allowed to turn with respect to each other; for given conditions of deformation of said pieces, and $\alpha$ and $\beta$ are, for the same conditions, the coefficients of expansion of the first piece along axes $Ox$ and $Oy$ respectively, and those of the second piece along axes $Ox'$ and $Oy'$ respectively, the piece the main axes of expansion of which are $Ox'$, $Oy'$ and $Oz'$ being provided with a cylindrical housing of the same cross-section as the above mentioned member and in which said member is fitted.

Preferred embodiments of the present invention will be hereinafter described with reference to the accompanying drawings, given merely by way of example and in which:

FIGS. 9 and 10 are two horizontal sections of an assembly member according to another embodiment of the present invention.

FIGS. 11 and 12 show, respectively in elevational view and in plan view, the assembly of two pieces having an orthotropic expansion by means of a member the upper portion of which has a cross-section such as shown by FIG. 9, and the lower portion of which has a cross-section such as shown by FIG. 10.

The examples hereinafter described relate to graphite bars assembled to form a moderator structure constituted by superimposed layers of such bars, the directions of the bars being crossed from one layer to the next one.

It should of course be well understood that such systems of assembly might be applied to pieces of another kind provided that they have an anisotropic expansion.

The two bars to be assembled together have main axes of expansion which are $Ox$, $Oy$, $Oz$ for one of them and $Ox'$, $Oy'$, $Oz'$ for the other. The coefficients of expansion are $\alpha$ for axes $Ox$ and $Ox'$ and $\beta$ for axes $Oy$ and $Oy'$. $Ox$ is at right angles to $Ox'$ and $Oy$ is at right angles to $Oy'$. The plane determined by axes $Ox$ and $Oy$ coincides with, or is parallel to, the plane determined by axes $Ox'$ and $Oy'$.

The play between these two pieces remains constantly the same if the surface of separation between these two pieces is in the form of a cylinder (the term "cylinder" being taken in its broadest meaning) complying with the following conditions:

The generatrices of the cylinder are parallel to the third main axis ($Oz$, $Oz'$) which is perpendicular to the two other main axes;

The base of the cylinder is given by a curve of the form:

$$(1+r)X^2 - (1-r)Y^2 = K$$

in which:

$Ox$ and $Oy$ are the bisectors of the angles made by $Ox$ and $Oy$;

$K$ is a constant;

$r$ is equal to $$\frac{\omega}{\alpha - \beta}$$

$\omega$ being the small angle through which the two pieces turn with respect to each other under given conditions of deformation and $\alpha$ and $\beta$ being the coefficients of expansion as above defined.

It will thus possible to assemble two juxtaposed pieces, as above defined, practically without any modification of the plays between pieces caused by the Wigner effect and the temperature variations, but with a small relative rotation $\omega$ which, in some cases, may be zero.

The surface of separation between these pieces is a straight cylinder the generatrices of which are parallel to axis $Oz$ and the basis of which is a curve as defined by the above equation, or an assembly of portions of curves given by said equation, said different curves corresponding to the same value of $r$ but to respectively different values of constant $K$.

On the basis of this principle, it is possible to assemble two parallel pieces as above mentioned so that said pieces are allowed to rotate or to slide with respect to each other in predetermined conditions, by making use of at least one intermediate connecting member (stud, pin, key, etc.) assembled with one of the pieces in the manner above described and with the other piece in the conventional manner.

Figure 1:
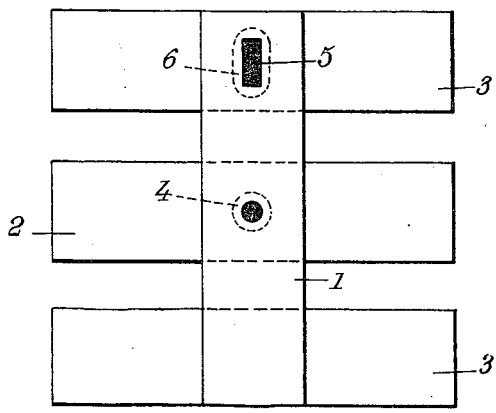
Figure 2:
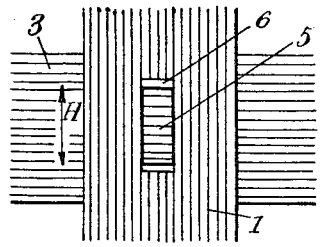
Figure 3:
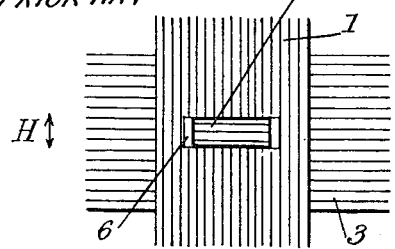
Figure 4:
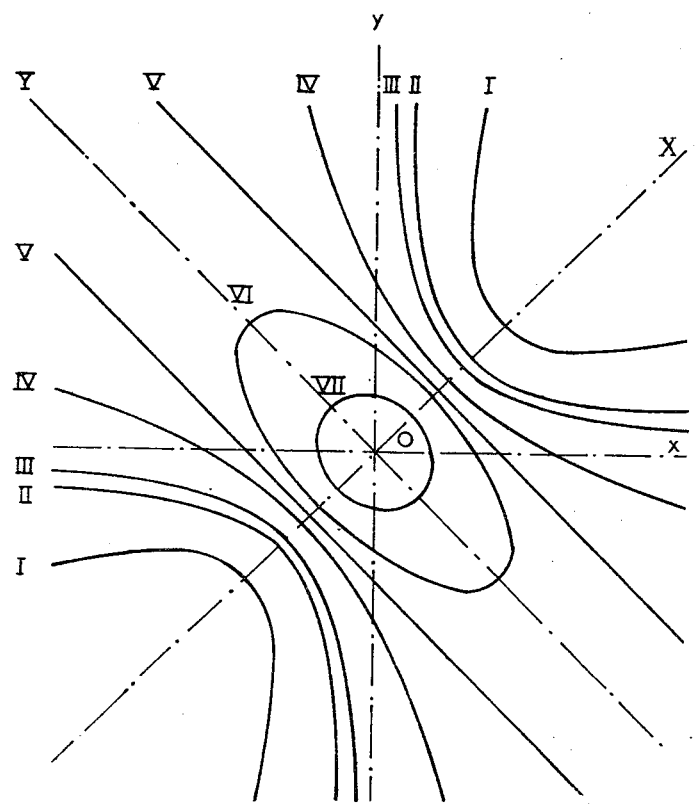
FIG. 4 shows a family of theoretical curves, given by the above stated equation and giving the shapes of assembly members to be used for connecting together pieces having an orthotropic expansion.

Among the shapes that can be used for the cross-section of the cylinder, seven curves of the same family are given by way of example on FIG. 4, these curves corresponding to a value of constant $K$ equal to one, so that the above stated equation becomes:

$$(1+r)X^2 - (1-r)Y^2 = 1$$

If $r$ ranges from $-1$ and $0$, the curves are such as shown at I and II, and the assembly permits a small rotation $\omega$ between the assembled bars.

If $r$ is equal to $0$, the curve is shown at III and no rotation is permitted between the two bars.

If $r$ ranges from $0$ to $+1$, the curve is shown at IV and a small rotation is also permitted but in a direction opposed to that first considered.

If $r$ is equal to $+1$, this small rotation may be accompanied by a relative sliding in a direction parallel to $OY$, the curve being shown at V.

If $r$ is greater than 1, the curves are as shown at VI and VII and a small rotation is permitted, combined with a sliding displacement.

By way of example, curve VI corresponds to $r=5$. With an assembly of this type, the elements being made of graphite for which coefficients $\alpha$ and $\beta$ are known, it has been calculated that one of the two bars assembled together turns through an angle equal to $5/100$ of a radian when the temperature of these bars passes from 20 to 250°. The maximum play is then only $1/20$ of a millimeter for an assembly member the greatest horizontal dimension of which is 100 mm.

The assembly elements the shapes of which will be hereinafter referred to correspond to curves I, II, III, IV, V, VI, VII and are made of materials the orthotropic expansion of which is of the same nature as the pieces which they serve to assemble together.

The assembly members corresponding to the four first curves I, II, III, IV are cut in the form of a straight cylinder having an hyperbolic cross-section. The axes of these hyperbolas make an angle of 45° with respect to the directions of extrusion of the bars to be assembled together.

Figure 5:
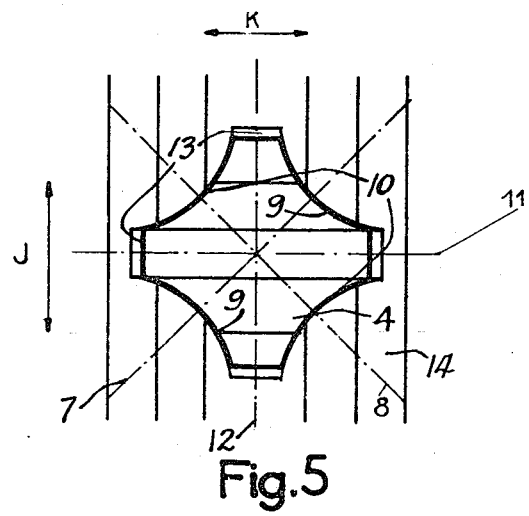
FIG. 5 shows, in horizontal section on the line V—V of FIG. 7, a system including a member the shape of which is determined to assemble together two pieces having an orthotropic expansion without possibility of rotation of said pieces with respect to each other.

The assembly member 4 (FIGS. 5, 6 and 7) corresponding to curve III corresponds to a preferred form of this invention because it prevents any relative rotation between the bars assembled together whatever be the values of the expansions. In the embodiment illustrated by the drawings, the cross-section of this assembly member is formed by portions of two conjugate equilateral hyperbolas 9 and 10 corresponding respectively to values $+1$ and $-1$ of constant K and by straight lines perpendicular to axes 11 and 12 (corresponding respectively to axes $Ox$ and $Oy$). The provision of an hyperbola 10 conjugate with hyperbola 9 is necessary in order to avoid sliding displacements parallel to axis 7 (corresponding to OX).

A housing 13 corresponding to said assembly member 4 is provided in each of the bars to be assembled together so that each asymptote 11 and 12 (FIG. 5) of the equilateral hyperbolas is parallel to the direction of extrusion of one of the bars and perpendicular to the direction of extrusion of the other.

Between the ends of the branches of the assembly member and those of the housings, a relatively large interval is provided because, at these points, it is not possible to have a constant play due to the asymptotic nature of the branches of hyperbolas.

Figure 6:
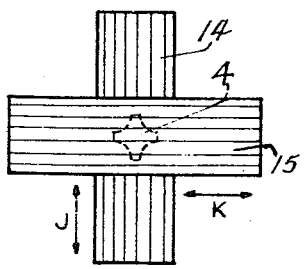
FIGS. 6 and 7 show, respectively in plan view and in elevational view, a system of assembly making use of the member shown by FIG. 5.
Figure 7:
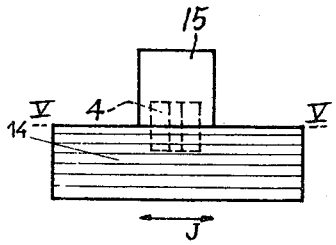

FIGS. 6 and 7 show the arrangement of the assembly member 4 in the bars 14 and 15, the lines of extrusion of said bars being shown respectively at J and K.

Figure 8:
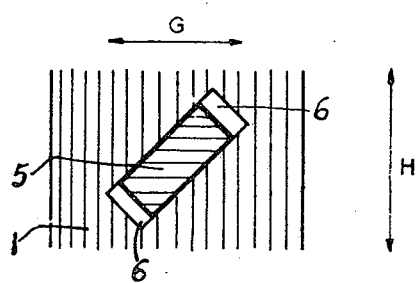
FIG. 8 shows a key member having an orthotropic expansion, housed in a bar having the same kind of expansion in such manner that the play between the key and its housing is independent of expansion.

The assembly member 5 of FIG. 8 corresponds to the curve V and is in the form of a rectangular parallelepipedon. Its sides are at 45° with respect to the lines of extrusion G of said assembly member.

This assembly member 5 is similar to the conventional key members above described, but it has not the disadvantages thereof. Its operation is intermediate between that of the key member the play of which in slot 6 decreases and that of the key member the play of which in slot 6 increases with the Wigner effect.

This slot 6 is cut at 45° to the lines of extrusion H of bar 1.

The assembly member 4 shown by FIG. 9 has a cross-section corresponding to the curve VI of FIG. 4, this cross-section being an ellipse. Said assembly member 4 is in the form of a cylinder the axis 17 of which is perpendicular to the plane along which the bars to be assembled are juxtaposed to each other. The main axes of the elliptical cross-section of said member 4 make an angle equal to 45° with the directions of extrusion J and K of the bars 14 and 15 to be assembled together. The direction of extrusion H of the assembly member 4 is at right angles to the direction of extrusion K of bar 14.

In the embodiment of FIGS. 10 to 12, the assembly member includes, in addition to portion 4 (in the form of an elliptical cylinder) and integral therewith, a cylindrical portion 16 of circular cross-section the axis 18 of which coincides with the axis 17 of portion 4. The direction of extrusion of this composite assembly member 4, 16, is parallel to the direction of extrusion J of bar 15 in which the portion 16 of the assembly member is housed.

Such an arrangement permits slight rotations between the two bars assembled together, which may be useful in some cases.

Of course, the assembly member above described may be provided with a portion integral therewith and in the form of a body of revolution or of a sliding key, to ensure a constant play assembly.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An assembly system for nuclear reactor moderator structures which comprises, in combination, two extruded pieces resting upon each other, said pieces being made of materials having at least substantially identical anisotropic expansion characteristics, each of said pieces having three main axes of expansion orthogonal to one another, these three axes being $Ox$, $Oy$, $Oz$ for one of the pieces and $Ox'$, $Oy'$, $Oz'$ for the other, these pieces being such that two of their main axes of expansion (respectively $Ox$ and $Oy$ for one of said pieces and $Ox'$ and $Oy'$ for the other) are located in two parallel planes, and that $Ox$ is perpendicular to $Ox'$ and $Oy$ to $Oy'$, $Ox$ being the direction of extrusion of one of said pieces and $Ox'$ the direction of extrusion for the other of said pieces, the piece the main axes of expansion of which are $Ox$, $Oy$ and $Oz$ being provided with a cylindrical recess extending in a direction parallel to axis $Oz$, an extruded assembly member made of a material having anisotropic expansion characteristics at least substantially identical to those of said pieces, the direction of extrusion of said member being at right angles to that of said last mentioned piece, at least a substantial portion of the surface of said member fitting against a portion of identical shape of the surface of said recess, said surface portions being in the form of a cylinder the generatrices of which are parallel to axis $Oz$ and at least a substantial portion of the cross-section of which consists of at least one curve given by the equation $(1+r)X^2-(1-r)Y^2=K$, OX and OY being the bisectors of the angles made by $Ox$ and $Oy$, K being a constant and $r$ being equal to the ratio $$\frac{\omega}{\alpha-\beta}$$

in which $\omega$ is the small angle through which the pieces can be allowed to turn with respect to each other, for given conditions of deformation of said pieces and $\alpha$ and $\beta$ are, for the same conditions, the coefficients of expansion of the first piece along axes $Ox$ and $Oy$ respectively, and those of the second piece along axes $Ox'$ and $Oy'$ respectively, $\alpha$ being different from $\beta$, said assembly member including another portion connected to the piece the main axes of expansion of which are $Ox'$, $Oy'$ and $Oz'$ so as to be fixed with respect thereto in all directions perpendicular to axis $Oz'$.

2. A system according to claim 1 in which constant K is equal to 1.

3. A system according to claim 1 in which said member is rigid with said second mentioned piece.

4. A system according to claim 1 in which said second mentioned portion of said member is slidably guided in said second mentioned piece in a direction parallel to axis $Oz'$.

5. A system according to claim 1 in which the cross-section of said surface portions is constituted by portions of two conjugate equilateral hyperbolas symmetrical with respect to axes OX and OY and by portions of straight lines perpendicular to OX and OY respectively and limiting said portions of hyperbolas.

6. A system according to claim 1 in which the cross-section of said surface portions is limited by two straight lines parallel to one of the axes OX and OY, and by two straight lines parallel to the other of said axes.

7. A system according to claim 1 in which the cross-section of the cylinder is an ellipse.

8. A system according to claim 1 in which the second portion of said member is in the form of a cylinder of revolution fitting in a corresponding housing of the second mentioned piece.

References Cited in the file of this patent
UNITED STATES PATENTS

| | | |
|---|---|---|
| 667,219 | Hieronymus | Feb. 5, 1901 |
| 724,897 | Lee | Apr. 7, 1903 |
| 2,837,477 | Fermi et al. | June 3, 1958 |
| 2,852,457 | Long et al. | Sept. 16, 1958 |
| 2,863,815 | Moore et al. | Dec. 9, 1958 |